United States Patent [19]

Doumani

[11] 4,155,770

[45] May 22, 1979

[54] MINERAL OIL MODIFIED LECITHIN COOKWARE SPRAY COMPOSITION

[75] Inventor: Charles Doumani, Los Angeles, Calif.

[73] Assignee: Blue Cross Laboratories, North Hollywood, Calif.

[21] Appl. No.: 892,487

[22] Filed: Apr. 3, 1978

[51] Int. Cl.$^2$ .............................................. C08L 91/00
[52] U.S. Cl. ...................................... 106/267; 426/609
[58] Field of Search ............... 106/244, 243, 267, 287, 106/24; 426/609

[56] References Cited

U.S. PATENT DOCUMENTS

| | | | |
|---|---|---|---|
| 2,559,481 | 3/1951 | Truesdell | 426/609 |
| 2,963,372 | 12/1960 | Brody et al. | 426/609 |
| 3,928,056 | 12/1975 | Szuhaj | 106/243 |
| 4,073,412 | 2/1978 | Doumani | 106/244 |

OTHER PUBLICATIONS

Chem. Abst., 46:9871d, 1952.

Primary Examiner—Theodore Morris
Attorney, Agent, or Firm—Louis J. Bachand

[57] ABSTRACT

A pump dispensable lecithin-based pan spray composition comprising lecithin in an essentially anhydrous vehicle comprising white mineral oil and vegetable oil and ethanol or isopropanol in proportions providing a Saybolt viscosity at 100° F. of less than 165, to be of pump sprayable consistency.

12 Claims, No Drawings

MINERAL OIL MODIFIED LECITHIN COOKWARE SPRAY COMPOSITION

BACKGROUND OF THE INVENTION

This invention has to do with pan spray compositions and more particularly relates to lecithin-based pan spray compositions, specifically those which are sprayable from finger actuable pump bottles.

Lecithin has found substantial favor as a lubricant for cookware of all kinds. Users ranging from health faddists through busy housewives apply lecithin to cookware in advance of cooking, to lubricate the cooking surfaces and prevent food sticking.

Lecithin is a naturally occurring material of complex character and nearly intractable consistency. Early efforts at packaging lecithin to take advantage of the excellent natural lubricity involved dissolving the lecithin in a Freon or like normally gaseous propellant, under substantial pressures in conventional aerosol packages, see U.S. Pat. No. 2,796,363 to Lalone, U.S. Pat. No. 3,896,975 to Follmer, U.S. Pat. No. 4,073,412 to Doumani and U.S. Pat. No. 4,073,411 also to Doumani. See also U.S. Pat. No. 4,023,912 to Mahler et al. for a lecithin cookware lubricant in a highly useful solid stick form.

Use of simple pump spray bottles for delivery of lecithin has been forestalled by the viscous nature of lecithin which makes finger pumping thereof arduous and ineffective, even when the lecithin is diluted with known diluents such as vegetable oils. Further, the difficultly delivered lecithin covers cookware erratically, too narrowly and/or with uneven depth and distribution for consumer effective performance.

SUMMARY OF THE INVENTION

It is therefore a primary objective of the present invention to provide a lecithin-based cookware lubricant composition which is pump-sprayable with minimum effort and which covers a suitably wide cookware area with uniformity of pattern and depth. It is another object of the invention to provide a lecithin-based cookware composition vehicle moderating the lecithin in a stable, reproducible and effective way, to ease delivery effort and improve spray properties. It is still another object to enable incorporation of ethanol or isopropanol in lecithin-based compositions with greater manufacturing tolerances as to water content and mixing temperatures.

These and other objects to become apparent hereinafter are realized in accordance with the invention in a pump dispensable lecithin-based pan spray composition comprising 2.5 to 35 parts of lecithin, preferably 10 to 25 parts, and the balance thereof an essentially anhydrous vehicle providing a pump sprayable consistency in the composition, a Saybolt viscosity at 100° F. of less than 165, and comprising 10 to 40 parts of white mineral oil having a Saybolt viscosity at 100° F. of less than 110, preferably 20 or 30 parts, and 25 to 55 parts of edible vegetable oil and preferably 40 to 50 parts, and from 0 to 25 parts of ethanol or isopropanol, preferably 5 to 15 parts, all per 100 parts by weight of the composition; these ingredients being relatively proportioned to provide a Saybolt viscosity of less than 165 SUS at 100° F.

Water in alcohol containing compositions tends to aggravate consistency problems, but its effect is minimized in the composition by the inclusion of white mineral oil which increases maximum water content tolerably through manufacturing and handling beyond that amount otherwise tolerable, i.e. less than the amount which forms a constant boiling mixture with the alcohol being used, up to about 5% by weight water based on the alcohol, where ethanol is the alcohol in use, and less than about 2.5% water (again based on the alcohol) where isopropanol is the alcohol employed in the composition. Maintenance of essentially anhydrous conditions, i.e. less than 2% water is, however, always desirable in these compositions, based on the alcohol weight.

The vegetable oil diluents employed are typically one or more of the glyceryl esters of fatty acids such as and particularly soybean oil, safflower oil, peanut oil, olive oil, corn oil, coconut oil, cottonseed oil, palm nut oil and apricot kernal oil.

PRIOR ART

In addition to the patents mentioned above, directed to lecithin cookware lubricants, other patents are available dealing with ethanol processing of lecithin, e.g. U.S. Pat. No. 1,150,691 to Martin teaches the extraction of lecithin from egg yoke with alcohol; U.S. Pat. No. 1,934,005, to Rewald teaches use of benzyl alcohol for the purpose of forming stable, soap-free aqueous emulsions of lecithin; U.S. Pat. No. 2,402,690 to Stanley teaches forming lecithin containing imbibitions for margarines by the use of ethyl alcohol, glycerine or the like with or in place of water; U.S. Pat. No. 3,257,331 to Jameston teaches lecithin systems of improved water dispersability through the use of polyethoxylated intersterified triglyceride oil emulsifiers derived from polyhydric aliphatic alcohols; U.S. Pat. No. 3,069,361 to Cogswell also relates to improved dispersions of lecithin in water and suggests use of alkylated phenoxypolyether alcohols therefor; U.S. Pat. No. 2,287,838 to Stanley and U.S. Pat. No. 2,777,817 to Werly teach lecithin-based systems of specifically different composition. U.S. Pat. Nos. 4,073,412 and 4,073,411, both to Doumani, teach aqueous emulsion systems containing lecithin, and such systems include mineral oil in viscosities up to 450 SUS or more. The use of emulsion technology renders there the high viscosities of the mineral oil of no great consequence. In the present compositions, which are "100% active" since the lecithin, vegetable oil and mineral oil are all effective lubricants, whereas water is not a pan lubricant, effective pump dispensability turns on the initial low viscosity being maintained during shelf life and without the inclusion of water as the "medium" in which active ingredients are emulsified. Emulsion systems are not satisfactory for pump spray bottles since air enters the container and thus bacteria can flourish in the aqueous environment. Accordingly high viscosity mineral oils, above 110 SUS at 100° F. are not useful herein.

DESCRIPTION OF THE PREFERRED EMBODIMENTS

Compositions of lecithin according to the invention are prepared by mixing together a fluid grade of lecithin, but having a unusable consistency and e.g. with an Acid No. of 24–25 (milligrams KOH/gram), with an essentially anhydrous vehicle comprising white mineral oil and a vegetable oil diluent together with an effective amount of ethanol or isopropanol. Mixing procedures are not narrowly critical; warming of ingredients and slow agitation are helpful but not necessary. Avoidance of undue presence of water facilitates effective mixing and insures good product performance, but amounts of water found objectionable in mineral oil free, ethanol or isopropanol containing systems, are not objectionable in the present mineral oil containing compositions.

The concentration of lecithin in the composition is such that a lubricating effective amount of lecithin is put down on the cookware by a simple finger actuation of a conventional plunger in a pump bottle. Amounts of lecithin as low as 2.5 parts in 100 parts of the composition will be useful, with higher amounts, up to 35 parts thereof being likewise useful, particularly where extra heavy applications of lecithin are desired, e.g. in roasting pans. Since lecithin is not particularly sprayable, use of less than maximum amounts of lecithin in the composition is to be preferred, e.g. a range of 10 to 25 parts, and most preferably, in the composition detailed below, 25 parts, per 100 parts by weight of the composition.

The white mineral oil employed typically is Klearol (sold by Sonneborn); it has a viscosity of 50/60 SUS. Other white mineral oils up to 110 SUS viscosity, (at 100° F.) are suitable. White mineral oils are mixtures of saturated aliphatic and napthenic hydrocarbons. Amounts thereof can be varied between 10 and 40 parts per 100 parts of the composition.

The composition may further contain a vegetable oil, as is known in lecithin systems, for the purposes of dilution. Useful vegetable oils are identified above. Amounts of vegetable oil can be varied within a relatively broad range, e.g. 25 to 55 parts, per 100 parts of the total composition. About 45 parts of e.g. soy oil is preferred. In general, from 60 to 80 parts of the composition is preferably combined mineral oil and vegetable oil.

Water, if present at all, should be limited to 2% by weight, based on the alcohol, but higher amounts such as might be resultant from manufacturing processes can be present, particularly where alcohol is omitted.

The use of zero to 25 parts of ethanol per 100 parts by weight of the composition is recommended, to reduce viscosity. Depending on the specific dip tube and nozzle assembly in the pump spray bottle, from 2.5 parts to as much as 25 parts ethanol (or isopropanol) is desirably used; perferred amounts are are between 5 and 15 parts, all per 100 parts by weight of the composition.

Throughout the present specification and claims all parts and percentages are by weight, unless indicated otherwise.

EXAMPLE 1

A commercial, bleached, fluid lecithin (Acid No. 24–25), 25 parts, was mixed with soy oil, 45 parts, and white mineral oil (50–60 SUS at 100° F.), 20 parts, at room temperature and was stirred with absolute ethanol (200 proof), 10 parts. The composition is free of water. The resulting mixture had a viscosity of 151 SUS at 100° F. and was subjectively evaluated for ease of pump spraying and adequacy of spray deposit.

Evaluations for sprayability revealed that this system pumped easily into a finely dropleted cone which gave good surface coverage of even depth and uniform pattern

EXAMPLE 2

Example 1 was repeated with this formula:

| | |
|---|---|
| Lecithin | 10 parts |
| White mineral oil | 30 parts |
| Soy oil | 50 parts |
| Ethanol | 10 parts |
| | 100 parts |

Viscosity was 93 SUS (at 100° F.) and spray evaluation was positive.

I claim:

1. A pump spray dispensable lecithin-based pan spray composition comprising, per 100 parts by weight of the composition, 2.5 to 25 parts of lecithin, and the balance thereof an essentially anhydrous vehicle comprising 10 to 40 parts of white mineral oil having a Saybolt viscosity at 100° F. of less than 110, 25 to 55 parts of vegetable oil and from 5 to 15 parts of ethanol, or isopropanol alcohol in proportions to provide in said composition a Saybolt viscosity at 100° F. of less than 165.

2. Pump dispensable lecithin-based pan spray composition according to claim 1 in which said lecithin is present in an amount between 10 and 25 parts by weight.

3. Pump dispensable lecithin-based pan spray composition according to claim 1 in which said composition is free of water.

4. Pump dispensable lecithin-based pan spray composition according to claim 3 in which said alcohol is isopropyl alcohol.

5. Pump dispensable lecithin-based spray composition according to claim 3 in which said alcohol is ethanol.

6. Pump dispensable lecithin-based pan spray composition according to claim 1 in which said vegetable oil is present in an amount between 40 and 50 parts by weight.

7. Pump dispensable lecithin-based pan spray composition according to claim 6 in which said mineral oil has a viscosity of 50–60 SUS at 100° F. and is present in an amount between 20 and 30 parts by weight.

8. Pump dispensable lecithin-based pan spray composition according to claim 7 in which lecithin is present in an amount between 10 and 25 parts by weight.

9. Pump dispensable lecithin-based spray composition according to claim 8 in which said vegetable oil is a glyceryl ester of a fatty acid.

10. Pump dispensable lecithin-based pan spray composition according to claim 11 in which said vegetable oil comprises one or more of soybean oil, safflower oil, peanut oil, olive oil, corn oil,, coconut oil, cottonseed oil, palm nut oil and apricot kernal oil.

11. Pump dispensable lecithin-based pan spray composition according to claim 10 in which ethanol is present in an amount between 5 and 15 parts by weight.

12. A pump dispensable lecithin-based pan spray composition comprising, per 100 parts by weight of the composition, 25 parts of lecithin, 20 parts of white mineral oil having a Saybolt viscosity at 100° F. of 50 to 110, 45 parts of soy oil and 10 parts of ethanol, said composition having a Saybolt viscosity at 100° F. of less than 165.

* * * * *